United States Patent [19]
Shields, Jr.

[11] Patent Number: 5,865,503
[45] Date of Patent: Feb. 2, 1999

[54] ARMREST CRADLE FOR ELECTRONIC COMMUNICATIONS HANDSET

[75] Inventor: Richard Allen Shields, Jr., Kirkland, Wash.

[73] Assignee: AT&T Wireless Services, Inc., Kirkland, Wash.

[21] Appl. No.: 550,130

[22] Filed: Oct. 30, 1995

[51] Int. Cl.[6] ................................................ A47C 7/72
[52] U.S. Cl. .............................. 297/188.14; 297/188.01; 297/188.18; 297/188.2; 297/217.3; 379/446; 379/455; 379/454; 379/449; 379/428
[58] Field of Search ................. 297/188.14, 188.01, 297/188.18, 188.2, 217.3; 379/446, 455, 454, 449, 428

[56] References Cited

U.S. PATENT DOCUMENTS

| | | |
|---|---|---|
| D. 361,568 | 8/1995 | Kepley, III et al. . |
| 4,881,258 | 11/1989 | Hollowed et al. . |
| 4,965,824 | 10/1990 | Hollowed et al. ....................... 379/428 |
| 4,977,592 | 12/1990 | Hollowed et al. ....................... 379/428 |
| 5,109,412 | 4/1992 | Hollowed et al. .................. 379/454 X |
| 5,128,992 | 7/1992 | Skowronski . |
| 5,128,993 | 7/1992 | Skowronski ........................ 379/428 X |
| 5,155,766 | 10/1992 | Skowronski ........................ 379/455 X |
| 5,157,722 | 10/1992 | Hollowed et al. ....................... 379/428 |
| 5,173,936 | 12/1992 | Ditzig et al. ........................ 379/428 X |
| 5,234,251 | 8/1993 | Ayotte ................................. 379/188.14 |
| 5,282,246 | 1/1994 | Yang ......................................... 379/455 |
| 5,394,467 | 2/1995 | Kepley, III et al. ..................... 379/438 |
| 5,410,597 | 4/1995 | Kepley, III et al. ................ 379/446 X |
| 5,418,836 | 5/1995 | Yazaki .................................. 379/428 X |
| 5,436,969 | 7/1995 | Kobayashi .......................... 379/428 X |
| 5,463,688 | 10/1995 | Wijas ...................................... 379/446 |
| 5,493,703 | 2/1996 | Yamashita ........................... 379/454 X |
| 5,524,050 | 6/1996 | Boerema et al. ................... 379/446 X |
| 5,556,017 | 9/1996 | Troy .............................. 297/188.14 X |

OTHER PUBLICATIONS

PCT International Search Report, PCT/US96/14443, Sep. 6, 1996.

*Primary Examiner*—Peter M. Cuomo
*Assistant Examiner*—Rodney B. White
*Attorney, Agent, or Firm*—Samuel Dworetsky

[57] ABSTRACT

A passenger seat armrest has a cradle cavity formed therein for removably securing an electronic communications handset such as a telephone. The electronic communications handset is held in the armrest so that it becomes part of the armrest when not in use. Alternatively, the armrest also accommodates electronic devices not necessarily related to the electronic communications handset, such as additional communications ports and transducer modules. The armrest is comprised of modular components for efficient assembly, yet can be installed and removed from a passenger chair as a single unit.

18 Claims, 3 Drawing Sheets

ARMREST CRADLE FOR ELECTRONIC COMMUNICATIONS HANDSET

BACKGROUND OF THE INVENTION

1. Field of the Invention

The invention relates to housings for electronic communications handsets. More particularly, the invention relates to cradles for an electronic communications handsets.

2. Description of the Related Art

Recent development and adaptation of electronic communications handsets, such as hand-held telephones and the like, have resulted in their use in commercial transportation, including commercial aircraft. For example, in commercial aircraft, telephone handsets and their cradles or holders have been incorporated whereby telephone service can be made by the user from the commercial aircraft to ground-based telephone equipment via radio-telephone links.

Many telephone handset and cradle combinations are known for use on commercial aircraft and adaptable to other modes of commercial transportation. Most of these devices are for seat-back mounting, i.e., for mounting onto or within the back surface of the passenger seat immediately in front of the intended passenger user or group of users. For example, see Hollowed et al. (U.S. Pat. No. 5,157,722) and Skowronski (U.S. Pat. No. 5,128,993 and U.S. Pat. No. 5,155,766). Also, see Kepley, III et al. (U.S. Pat. No. 5,410,597), which is co-owned with this application.

Additionally, a number of associated features are known for use with these telephone sets, including latching mechanisms (e.g., see Hollowed et al., U.S. Pat. No. 5,157,722), telephone ejector mechanisms activated by credit cards (e.g., see Hollowed et al., U.S. Pat. Nos. 4,881,254 and 4,977,592) and telephone cord reel (e.g., see Hollowed et al 5,109,412). Also, see generally Yazaki U.S. Pat. No. 5,418,836 and Ditzig et al. U.S. Pat. No. 5,173,936.

In U.S. Pat. No. 4,965,824, Hollowed et al. describe a telephone handset cradle that includes a credit card activated latching mechanism and a mounting means such as a bracket or the like. The patent teaches of installing or mounting the telephone handset and cradle device "under the armrest of an aircraft seat, or perhaps under or on the armrests of seats such as those included in limousines, boats, trains and the like".

As is known, space is at a premium in all modes of commercial transportation, particularly in commercial aircraft. Therefore, it is desirable to have available a cradle or holder for an electronic communications handset that makes efficient use of the limited space available in commercial modes of transportation, including commercial aircraft.

SUMMARY OF THE INVENTION

According to its major aspects and broadly stated, the invention is an armrest for use with passenger seating. In particular, it is an armrest having a cradle cavity formed therein for removably securing an electronic communications handset such as a telephone. The electronic communications handset is held in the armrest so that it becomes part of the armrest when not in use. Alternatively, the armrest also accommodates electronic devices not necessarily related to the electronic communications handset, such as additional communications ports and transducer modules. The armrest is comprised of modular components for efficient assembly, yet can be installed and removed from a passenger chair as a single unit.

DETAILED DESCRIPTION

Figure 1:
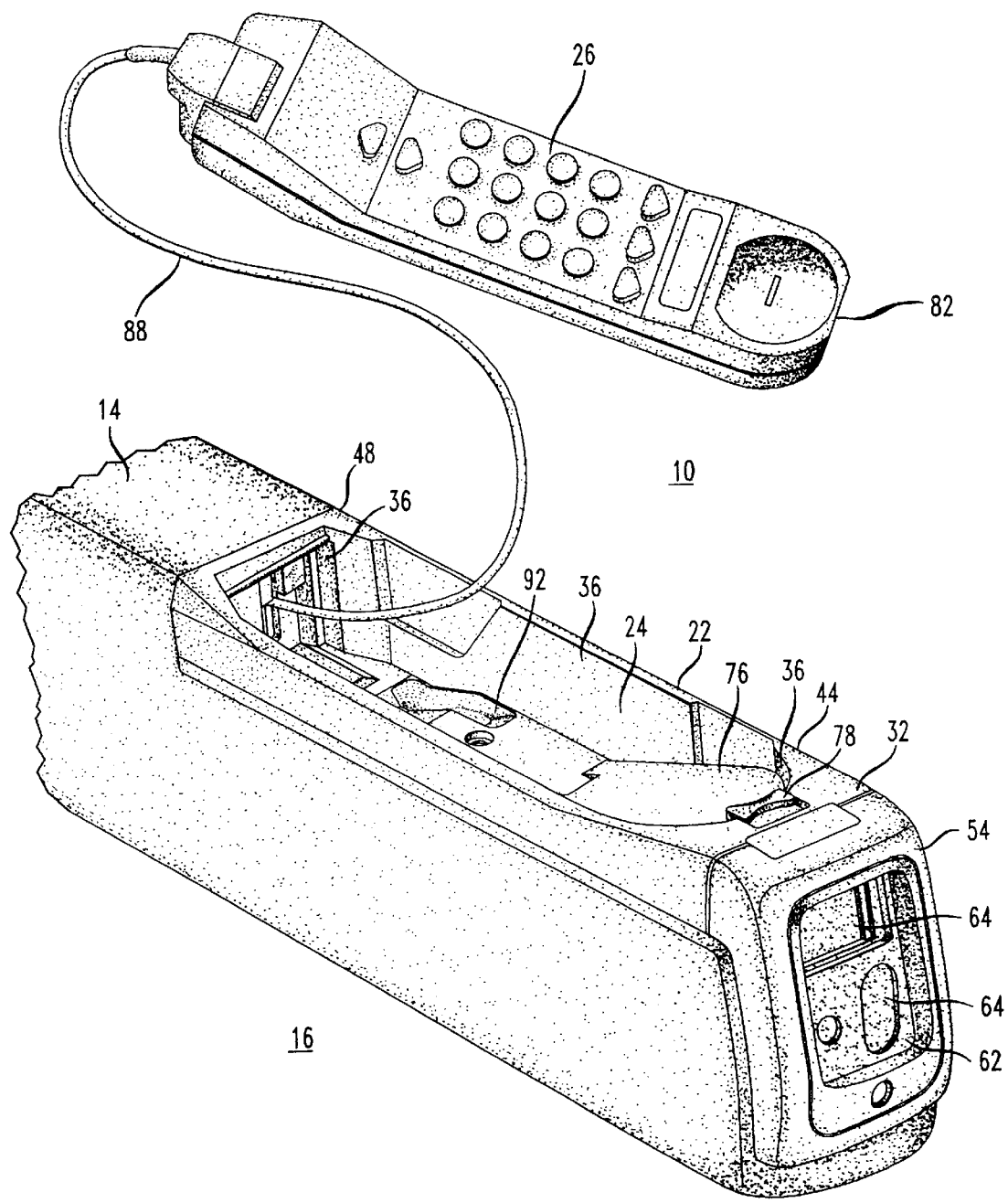
FIG. 1 is a perspective view of an armrest according to an embodiment of the invention.

In the following description similar components are referred to by the same reference numeral for purposes of consistency throughout the drawings.

Referring now to FIG. 1, an armrest 10 according to an embodiment of the invention is shown. Associated with armrest 10 is an armrest frame 14 or other suitable arrangement that coincides with a chair 16, e.g., a passenger seat in an aircraft, train or other mode of transportation. Armrest 10 comprises a molded frame 22 having a cradle cavity 24 formed therein. Cradle cavity 24 is dimensioned to receive and secure an electronic communications handset 26, such as a wireless or wired telephone, and including the electronic communications handsets shown and described in the following commonly assigned U.S. patents: U.S. Pat. No. 5,410,597 issued Apr. 25, 1995 to Kepley, III et al. and entitled "Wired Seat Back Aircraft Telephone Set"; U.S. Pat. No. 5,39,467 issued Feb. 28, 1995 to Kepley, III et al. and entitled "Multi-Purpose Telephone Strain Relief"; and Des. U.S. Pat. No. 361,568 issued Aug. 22, 1995 to Kepley, III et al. and entitled "Airplane Telephone Set", all of which are hereby incorporated by reference.

Cradle cavity 24 is dimensioned and configured so that electronic communications handset 26 is substantially flush with a top surface 32 of molded frame 22 when secured in cradle cavity 24. Cradle cavity 24 is defined by a floor 34 and plurality of walls 36. When electronic communications handset 26 is secured in cradle cavity 24, electronic communications handset 26 together with top surface 32 of molded frame 22 form an armrest that provides support for a passenger seated in chair 16. However, even when electronic communications handset is removed from cradle cavity 24, top surface 32 still provides adequate armrest support for a passenger seated in chair 16.

It is advantageous to fixably attach to a distal end 44 of molded frame 22 a protective bezel 54 and a bracket 56, as shown. Also, a front panel or plate 62 is connected to bezel 54 and easily removable therefrom to grant access behind bezel 54 for installation and/or service of other electronic devices. Bezel 54, panel 62 and bracket 56 collectively define an area behind bezel 54 and under molded frame 22 that is adapted for housing or positioning a selected plurality of electronic devices. Panel 62, in one embodiment, has one or more openings 64 for accommodating the electronic devices.

For example, an audio transducer module (not shown) or similar device that is operating independently of electronic communications handset 26 can be installed between bracket 56 and bezel 54 so that its operating controls are accessible through one of the openings 64 in panel 62. Also, for example, a communications line (not shown), either related or unrelated to electronic communications handset 26, can be installed under, within or behind armrest 10 so that its associated communications port or jack (not shown) fits snugly within one of the openings 64 in panel 62 for operational access thereto.

It should be noted that bezel 54 and its configuration enhance the applicability of armrest 10 to environments in which space is limited, such as with seating in commercial modes of transportation, especially seating in commercial aircraft. That is, bezel 54, in addition to providing a comfortable endpiece to the armrest structure formed by molded frame 22, defines a compact area in which devices in addition to electronic communications handset 26 are to be positioned. Also, bezel 54 and its connection with distal end 44 of molded frame 22 is designed to be modular so that various bezel styles are suitable for connection with molded frame 22.

Figure 2:
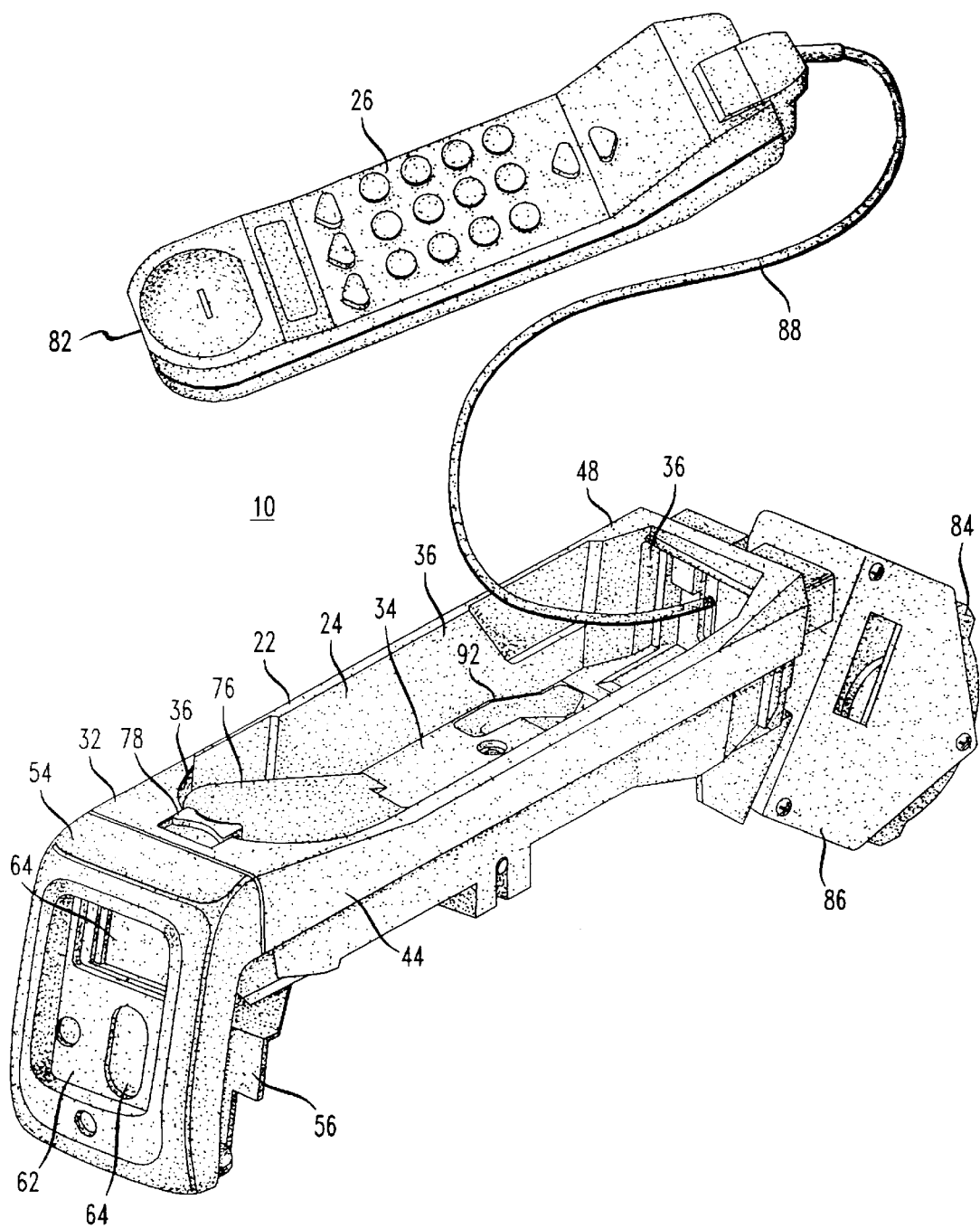
FIG. 2 is a perspective view of the armrest in FIG. 1 shown in use with an electronic communications handset.
Figure 3:
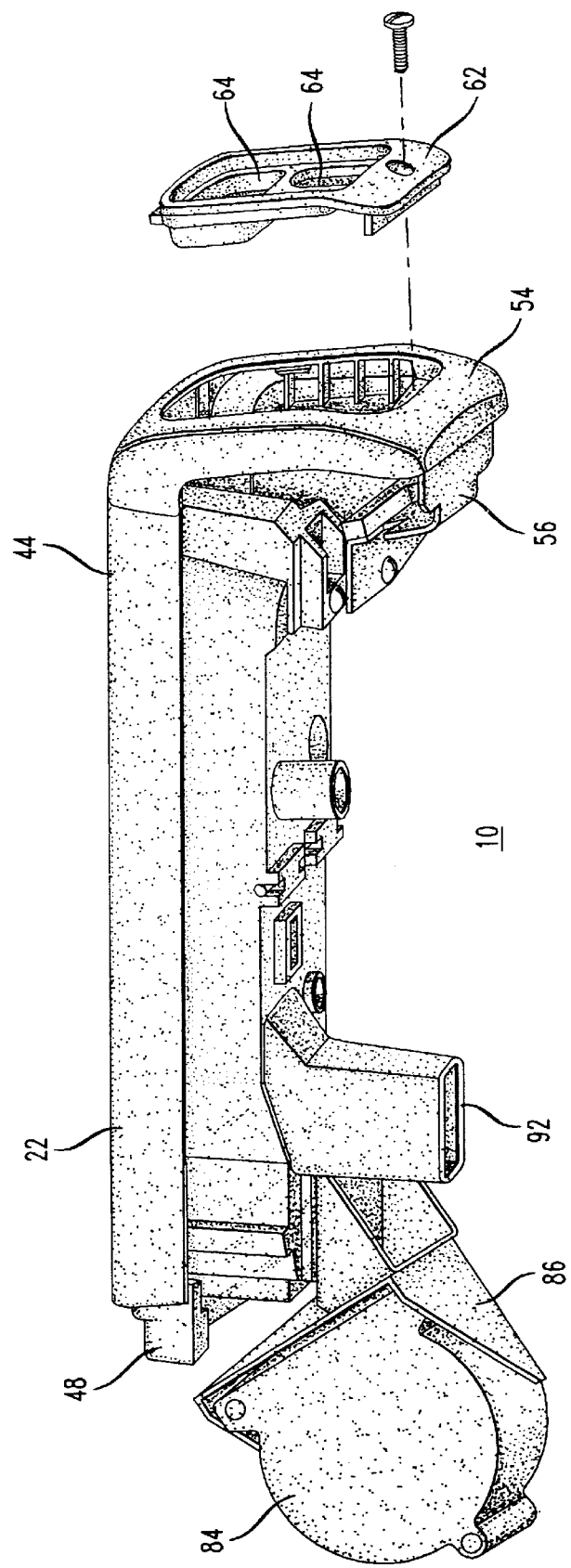
FIG. 3 is a side view of the armrest in FIGS. 1 and 2.

An ejector mechanism, e.g. a spring biased ejector plate 76 and an ejector button 78 shown in FIGS. 1–3, is connected to molded frame 22 and operated to controllably urge, eject or otherwise release electronic communications handset 26 from cradle cavity 24, as desired. However, it is within the scope of one skilled in the art to use any suitable ejector mechanism to urge electronic communications handset 26 from cradle cavity 24.

For example, with respect to the ejector mechanism shown, ejector button 78 has a tongue (not shown) that engages a corresponding groove (not shown) on the front end 82 of electronic communications handset 26 to keep electronic communications handset 26 secured within cradle cavity 24. However, ejector button 78 is movable so that the tongue becomes disengaged from the corresponding groove, thus causing ejector plate 76, which is rotatably connected to and spring biased away from floor 34, to urge or eject at least front end 82 of electronic communications handset 26 from cradle cavity 24 to the extent that a user can manually remove electronic communications handset 26 completely from cradle cavity 24.

Again, although a specific example of an ejector mechanism is shown in FIGS. 1–3 and described above, other suitable ejector mechanisms can be used to urge electronic communications handset 26 from cradle cavity 24 in response to movement of an appropriate ejector button, tab or latch. For example, an ejector mechanism that prevents unauthorized use of electronic communications handset 26 is adaptable for use with armrest 10. Such mechanisms typically require the use of a credit-card or similar article to enable the ejector mechanism, thus allowing use of electronic communications handset 26. Alternatively, such mechanism is contained or formed integrally with electronic communications handset 26, e.g., a slot or other receiving device requiring a credit-card or similar article to activate electronic communications handset 26.

A communications line holder and/or retractor, e.g., a cord reel 84, is operably connected to molded frame 22 via a bracket 86 or other suitable connecting mechanism to provide wiring to electronic communications handset 26, if desired, or possibly to any of the additional electronic devices positioned behind bezel 54 and panel 62. For example, cord reel 84 is suitable for mounting to a proximal end 48 of molded frame 22 so that a retractable communications line 88 connected to, e.g., electronic communications handset 26, is available and dispensed thereto when electronic communications handset 26 is removed from cradle cavity 24. Accordingly, communications line 88 is stored in cord reel 84 when electronic communications handset 26 is secured within cradle cavity 24.

Depending on the specific configuration of armrest 10 and chair 16, the communications line holder is adaptable to be hidden from sight, e.g., in an additional seat arm portion, within an upright portion of the seat or simply tucked under an available region of armrest 10. Therefore, the communications line holder likely will not be in plain view of a passenger seated in chair 16 or those seated in chairs behind or adjacent to chair 16.

In use, electronic communications handset 26 is typically removed from cradle cavity 24 prior to operation. However, because electronic communications handset 26 is secured within cradle cavity 24 with its upper face and at least some of its function buttons accessible, electronic communications handset 26 can be operated, at least to a certain extent, while still remaining secured within cradle cavity 24.

Formed into floor 34 of cradle cavity 24 is a channel or port 92 that allows spillage entering cradle cavity 24 to drain out of molded frame 22 and down through armrest 10. Floor 34 is configured to facilitate migration of any spillage in cradle cavity 24 toward drainage channel 92. For example, if drainage channel 92 is located near proximal end 48 of molded frame 22, as shown in FIGS. 1–3, then floor 34 is slightly graded from distal end 44 down toward proximal end 48. In this manner, spillage such as fluid material can be moved away from cradle cavity 24 as quickly as possible to avoid interference with and possible malfunction of electronic communications handset 26 or other electronic devices.

Additionally, floor 34 is slanted slightly from one side of molded frame 22 to the other so that electronic communications handset 26 tilts correspondingly toward one side of armrest 10 when secured in cradle cavity 24. In this manner, armrest 10 is adaptable to be made in specific versions, i.e., for the right or left side of a passenger seat. The specific versions of armrest 10 allow an electronic communications handset 26 secured therein to angle slightly towards the body of the passenger seat, thus providing additional armrest comfort for the occupant of the seat.

The overall configuration of molded frame 22 depends on its particular application. That is, molded frame 22 can be formed as an attachment that operably connects to an existing armrest or armrest frame, or one that connects to a specially manufactured chair. Alternatively, molded frame 22 is integrally formed as part of an entire armrest or the entire arm of an existing or specially manufactured commercial seat. Furthermore, molded frame 22 is formed as part of a commercial seat or chair that has arms integrally formed therewith. Accordingly, it will be understood that, except for the novel armrest structure described herein, seating arms and passenger seats according to the invention can have conventional structure.

Because of its compact design and suitable molding material available, molded frame 22 is suitable for being formed as a single, modular piece that is adaptable for installing and or removing from an existing armrest arrangement. Furthermore, such a compact modular design lends itself well to existing commercial transportation environments in which space is limited.

It will be apparent to those skilled in the art that many changes and substitutions can be made to the armrest herein described without departing from the spirit and scope of the invention as defined by the appended claims.

What is claimed is:

1. An armrest for use with a chair, said armrest comprising:

a molded frame having a proximal and distal end, wherein said distal end defines the end of the armrest and is accessible to a user and including a top surface forming an integral part of the armrest for a passenger seated in a chair, and including a cradle cavity formed within the top surface of the molded frame, said cradle cavity dimensioned to receive and removably secure therein an electronic communications handset whereby at least a portion of said electronic communications handset provides armrest support along with said molded frame when said electronics communications handset is received within said cradle cavity and so that at least a portion of said electronic communications handset can be operated when secured in said cradle cavity, and a bezel connected to the distal end of the molded frame and accessible to a user and having a panel removably connected to said bezel, said bezel defining a chamber for operably positioning therein at least one electronic device whereby at least one electronic device is accessible through said panel.

2. The apparatus as recited in claim 1, further comprising an ejector mechanism in operable connection with said frame for releasing said electronic communications handset from said cradle cavity.

3. The apparatus as recited in claim 1, further comprising a retractable communications line in electrical communication with said electronic communications handset.

4. The apparatus as recited in claim 1, further comprising a channel formed in said frame for defining a drainage path from said cradle cavity through said armrest to said chair.

5. The apparatus as recited in claim 1, further comprising a passenger chair wherein at least one of said armrests is operably connected thereto.

6. The apparatus as recited in claim 1, wherein said cradle cavity is formed within said frame so that said electronic communications handset tilts toward said chair when operably positioned within said cradle cavity.

7. An armrest attachment for use with the armrest of a passenger chair, said armrest attachment comprising:

a molded frame having a proximal and distal end, wherein said distal end defines the end of the armrest of a passenger chair and is accessible to a user, and a top surface forming an integral part of the armrest for a passenger seated in a chair, and including a cradle cavity formed within the top surface of the molded frame and dimensioned to removably secure an electronic communications handset therein, and wherein said electronics communication handset is received within said cradle cavity and forms part of the armrest support; and a bezel connected to said distal end of said frame, said bezel having a panel removably connected thereto, said bezel defining a chamber with said distal end of said frame dimensioned for operably positioning therein at least one electronic device that operates independently of said electronic communications handset, at least one electronic device positioned within said chamber so as to be accessible through said panel and a bracket fixably connected to said distal end of said frame between said frame and said bezel for operably positioning the electronic device.

8. The apparatus as recited in claim 7, further comprising an ejector mechanism in operable connection with said frame and said cradle cavity for releasing said electronic communications handset from said cradle cavity, said ejector mechanism having a tab movable between a releasing position and a securing position so that, when said tab is in said securing position, said electronic communications handset can be secured within said cradle cavity and when said tab is in said releasing position, said electronic communication handset is released from said cradle cavity.

9. The apparatus as recited in claim 7, further comprising a cord reel operably connected to said frame, said cord reel having a retractable communications line in electrical communication with said electronic communications handset.

10. The apparatus as recited in claim 7, whereby said electronic communications handset provides armrest support when secured in said cradle cavity.

11. The apparatus as recited in claim 7, wherein said cradle cavity has a floor and wherein said armrest further comprises a channel formed through said cradle cavity floor, said channel establishing a drainage path from said cradle cavity through said armrest to said arm of said chair.

12. The apparatus as recited in claim 7, further comprising a passenger chair having at least one armrest wherein said molded frame is connected to each of said at least one armrest.

13. The apparatus as recited in claim 7, wherein said frame has a first side and an opposing second side between said proximal and distal ends, wherein said electronic communications handset has a first face and wherein said cradle cavity is formed within said frame so that said first face of said electronic communications handset tilts toward said first side and away from said second side when operably positioned within said cradle cavity.

14. An apparatus for removably securing an electronic communications handset therein, said apparatus for use with a plurality of electronic devices operating independently of said electronic communications handset, the electronic devices including an electronic module, said apparatus comprising:

a modular frame having a proximal and distal end which defines the end of the armrest of a passenger chair when assembled, and a modular frame having a top surface and a cradle cavity formed within the top surface, said cradle cavity dimensioned to receive and removably secure said electronic communications handset so that said modular frame and electronics communications handset form a part of an armrest support of a passenger chair; and a modular arrangement connected to said frame for operably positioning said plurality of electronic devices within said apparatus whereby the plurality of electronic devices are accessible; said modular arrangement including a bracket fixably connected to said modular frame for connecting thereto a first side of an electronic module: and a bezel connected to the distal end of said modular frame for connecting thereto a second side of said electronic module, said bracket and said bezel defining therebetween an opening dimensioned to receive said electronic module, and an ejector mechanism in operable connection with said frame for releasing said electronics communications handset from said cradle cavity.

15. The apparatus as recited in claim 14, wherein said apparatus further comprises:

a bracket fixably connected to said frame; and a cord reel connected to said bracket whereby said cord reel is in electrical communication with said electronic communications handset.

16. The apparatus as recited in claim 14, further comprising a channel formed in said frame for defining a drainage path from said cradle cavity through said armrest to said arm of said chair.

17. The apparatus as recited in claim 14, wherein said cradle cavity is formed within said frame so that said electronic communications handset tilts toward said chair when operably positioned within said cradle cavity.

18. The apparatus as recited in claim 14, wherein said apparatus is configured as the armrest of a passenger chair.

* * * * *